United States Patent Office 3,623,898
Patented Nov. 30, 1971

3,623,898
INTERIOR PLASTER COATING COMPOSITION
Nicholas A. Limberis, Bonita Springs, Fla., assignor to Durable-Dri-Hard-Wall, Inc., Miami, Fla.
No Drawing. Filed Oct. 9, 1969, Ser. No. 865,170
Int. Cl. C04b 11/10, 11/12
U.S. Cl. 106—109
4 Claims

ABSTRACT OF THE DISCLOSURE

A dry plaster composition for use as an interior surface coating comprising 33-38 weight percent gypsum, 7.5-10 weight percent quicklime, 45-55 weight percent silica and 1.25-2.50 weight percent white portland cement.

---

This invention relates to a plaster coating composition and more particularly to a plaster coating composition for interior use which hardens and sets in a relatively short period of time thereby permitting, if desired the application of paint thereon without any blistering, peeling, chipping effects.

Known interior plaster coating compositions generally are difficult and time consuming to apply and require a relatively long period of time to set and harden before a finishing coating, such as a paint coating, can be applied to the surface thereof. Further, because of the slow setting up characteristics of these known interior plaster compositions, it is generally difficult or impractical to produce coatings having a thickness greater than ⅛ inch except incrementally. Moreover, it is also not ordinarily possible to apply a paint coating onto the surface of known interior plaster coatings for a considerable time, usually at least about 48 hours, after the plaster coating has been applied to the substrate. This is due principally to the slow setting up characteristics of conventional plaster coating compositions and to the fact that during the drying and hardening period, the plaster tends to dry first and then harden, the dissipation of the exothermic reaction heat spanning essentially the entire heating period and thus preventing the application of a paint coating thereon to avoid blistering, chipping or peeling of the same.

Industry, consequently, has been constantly seeking an interior plaster composition which can be applied as a one-coat system to a substrate such as gypsum board, sheetrock, plywood, fiber glass, foamed synthetic polymers and the like to produce an interior wall finish for private dwelling units, apartments, factories, office buildings and the like. A further desideratum of such a plaster composition is its ability to be applied in a variety of thicknesses. The instant invention now provides industry with a plaster composition that meets these requirements and which can be applied to substrate in any conventional manner such as a trowelable mix.

The interior plaster coating composition of this invention comprises 33-38 weight percent gypsum, 7.5-10 weight percent calcined lime or quicklime, 45-55 weight percent silica and 1.25-2.50 weight percent white portland cement.

The term "silica" herein includes silica, per se, marble dust or any other conventionally employed inorganic filler material. The term "gypsum" refers to commercially available calcined gypsum which has been heated to about 120-150° C. and can be the half hydrate or anhydrous form. The term "lime" refers to quicklime or finish lime and any commercially available lime can be employed. Generally commercial lime is a high calcium quicklime containing 90 percent or better calcium oxide and 0-5 percent magnesia with small percentages of calcium carbonate, silica, alumina and ferric oxide as impurities. Commercially available white portland cement contains about 60-68 percent calcium oxide, 18 to 20 percent silica and small proportions of alumina, magnesia, various alkalies, $SO_3$ and less than 6 percent ferric oxide and generally about 1.5-3 percent thereof.

In preparing the plaster composition of this invention water is added to the mixed dry ingredients preferably in an agitated mixer. A trowable mix can be prepared on the job site and applied to any desired substrate to provide a fine interior wall surface. It will be recognized, of course, that the use of additional amounts of water will produce a composition that can be applied to the surface by other techniques such as by brushing, rolling or spraying.

One advantageous feature of the present plaster composition is its ability to harden and set in a relatively short period of time, i.e. about 45 minutes to 2 hours, thereby permitting immediate application of a paint coating thereon. Contrary to known interior plaster coating compositions, the plaster coating composition of this invention hardens initially and dissipates the exothermic reaction heat in a relatively short period of time. Thereafter the coating sets within the 45 minutes to 2 hour period and a paint coating can be immediately applied to this hard, dry plaster coating without causing any blistering, peeling or chipping thereof.

The following examples are illustrative of the present invention.

EXAMPLE 1

An interior plaster coating composition was formulated as follows:

| | Lbs. |
|---|---|
| White portland cement | 1.5 |
| Gypsum | 28 |
| Lime | 7 |
| Sand or marble dust (No. 15 grade) | 40 |

The above dry plaster coating composition contained 36.6 weight percent gypsum, 9.14 weight percent quicklime, 52.3 weight percent silica and 1.96 weight percent white portland cement.

Three gallons of water were added to the above mixed dry ingredients in an agitated mixer and the resulting trowelable mix was applied to an interior wall substrate to provide a ⅛ inch interior coating thereon covering 18 square yards. The plaster coating hardened and set in 1.5 hours and was suitable for immediate application thereon of a paint coating.

EXAMPLE 2

Another interior plaster coating composition was formulated as follows:

| | Lbs. |
|---|---|
| White portland cement | 1 |
| Gypsum | 28 |
| Lime | 7 |
| Sand or marble dust (No. 15 grade) | 40 |

The above dry plaster coating composition contained 36.8 weight percent gypsum, 9.2 weight percent quicklime, 52.7 weight percent silica and 1.32 weight percent white portland cement. To this mixture were added three gallons of water and the resulting trowelable mix was applied to a wall to provide a ⅛ inch thick interior plaster coating covering 18 square yards which hardened and set in two hours.

EXAMPLE 3

Still another plaster coating composition was formulated as follows:

| | Lbs. |
|---|---|
| White portland cement | 1.75 |
| Gypsum | 28 |
| Lime | 7 |
| Sand or marble dust (No. 15 grade) | 40 |

The above dry plaster coating composition contained 36.5 weight percent gypsum, 9.12 weight percent quicklime, 52.1 weight percent silica and 2.28 weight percent white portland cement.

This dry composition after admixture with three gallons of water provided a trowelable mix which was applied to a wall surface. The resulting coating ⅛ inch thick covering 18 square yards hardened and set in about 45 minutes.

The amount of white portland cement can be varied slightly depending on the ambient temperature at the time of application of the coating to the substrate. Thus, the higher the temperature the lesser the amount of white portland cement and conversely the lower the temperature the larger the amount of cement.

What is claimed is:

1. A dry plaster composition for use as an interior surface coating adaptable to the reception of paint thereon without blistering, chipping, peeling or the like within a period ranging from about ¾ to 2 hours, said composition consisting essentially of 33–38 weight percent gypsum in the half hydrate or anhydrous form, 7.5–10 weight percent quicklime, 45–55 weight percent silica and 1.25–2.50 weight percent white portland cement.

2. The plaster composition of claim 1 which contains 36.6 percent gypsum, 9.14 percent quicklime, 52.3 percent silica and 1.96 percent white portland cement.

3. The plaster composition of claim 1 which contains 36.5 percent gypsum, 9.12 percent quicklime, 52.1 percent silica and 2.28 percent white portland cement.

4. The plaster composition of claim 1 which contains 36.8 percent gypsum, 9.2 percent quicklime, 52.7 percent silica and 1.32 percent white portland cement.

References Cited

UNITED STATES PATENTS

| 1,268,000 | 5/1918 | Funck | 106—110 |
|---|---|---|---|
| 1,480,867 | 1/1924 | Smith | 106—110 |

JAMES E. POER, Primary Examiner

U.S. Cl. X.R.

106—110, 118, 120